July 23, 1963 J. P. CALCATERRA 3,098,518
FLANGING AND SWEDGING MACHINE FOR DRUM BODIES
Filed Aug. 9, 1961 6 Sheets-Sheet 2

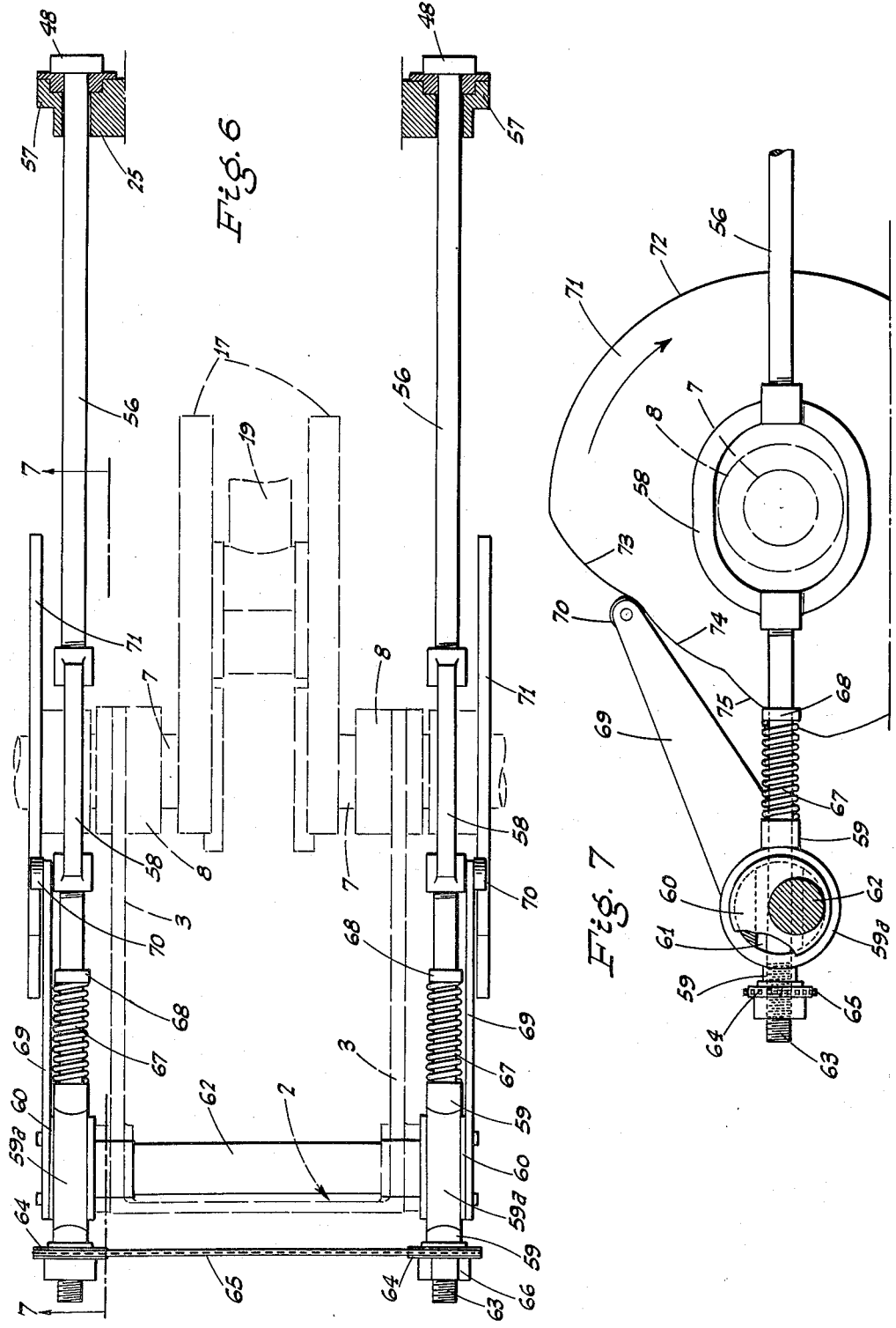

United States Patent Office 3,098,518
Patented July 23, 1963

3,098,518
FLANGING AND SWEDGING MACHINE FOR DRUM BODIES
Joseph P. Calcaterra, Stockton, Calif., assignor to Carando Machine Works, Stockton, Calif., a partnership
Filed Aug. 9, 1961, Ser. No. 130,425
9 Claims. (Cl. 153—79)

This invention relates to a drum body swedging and flanging machine, and particularly represents improvements over the structure shown in my United States Patent No. 2,720,241, dated October 11, 1955.

In said patented machine the action was limited to the formation, by die heads, of circumferential beads or ribs on the drum bodies intermediate the ends thereof, leaving the end beads or flanges to be formed in a separate machine.

One of the major objects of the present invention is to provide a machine which will, at one operation, both cause the end flanges or beads to be formed on a drum, and also the intermediate circumferential beads or ribs. The necessity for a separate machine, with the added cost and floor space which this entails, is thus avoided.

With the bead-forming mechanism as provided in the previous machine it was found that the bead-forming dies tended to stick or wedge in the formed beads, and would not readily release or strip themselves therefrom. This is because the axial extent of the drum between the beads is naturally decreased as the metal is deformed by the bead forming operation, whereas the distance between the dies themselves was fixed and constant.

It is therefore another important object of this invention to provide means, incorporated in the machine, whereby the dies will be allowed to automatically move toward each other, as the dies are expanded, to an extent sufficient to compensate for the decrease in distance between the beads as the latter are formed. By so doing, the dies do not wedge or bind in the beads, and will readily withdraw or strip themselves from the formed beads as the die expanding cones are retracted.

A further object of the invention is to provide readily actuated adjustment means whereby the distance between the beads and the depth of such beads may be separately altered to suit. Also, adjustments may be readily made to compensate for the specific length of any drum body being worked on, and as to whether flanges or beads—or one of each—shall be formed on the ends of such drum body.

It is also an object of the invention to provide a practical, reliable, and durable flanging and swedging machine for drum bodies, and one which will be exceedingly effective for the purpose for which it is designed.

These objects are accomplished by means of such structure and relative arrangement of parts as will fully appear by a perusal of the following specification and claims.

Figure 1:
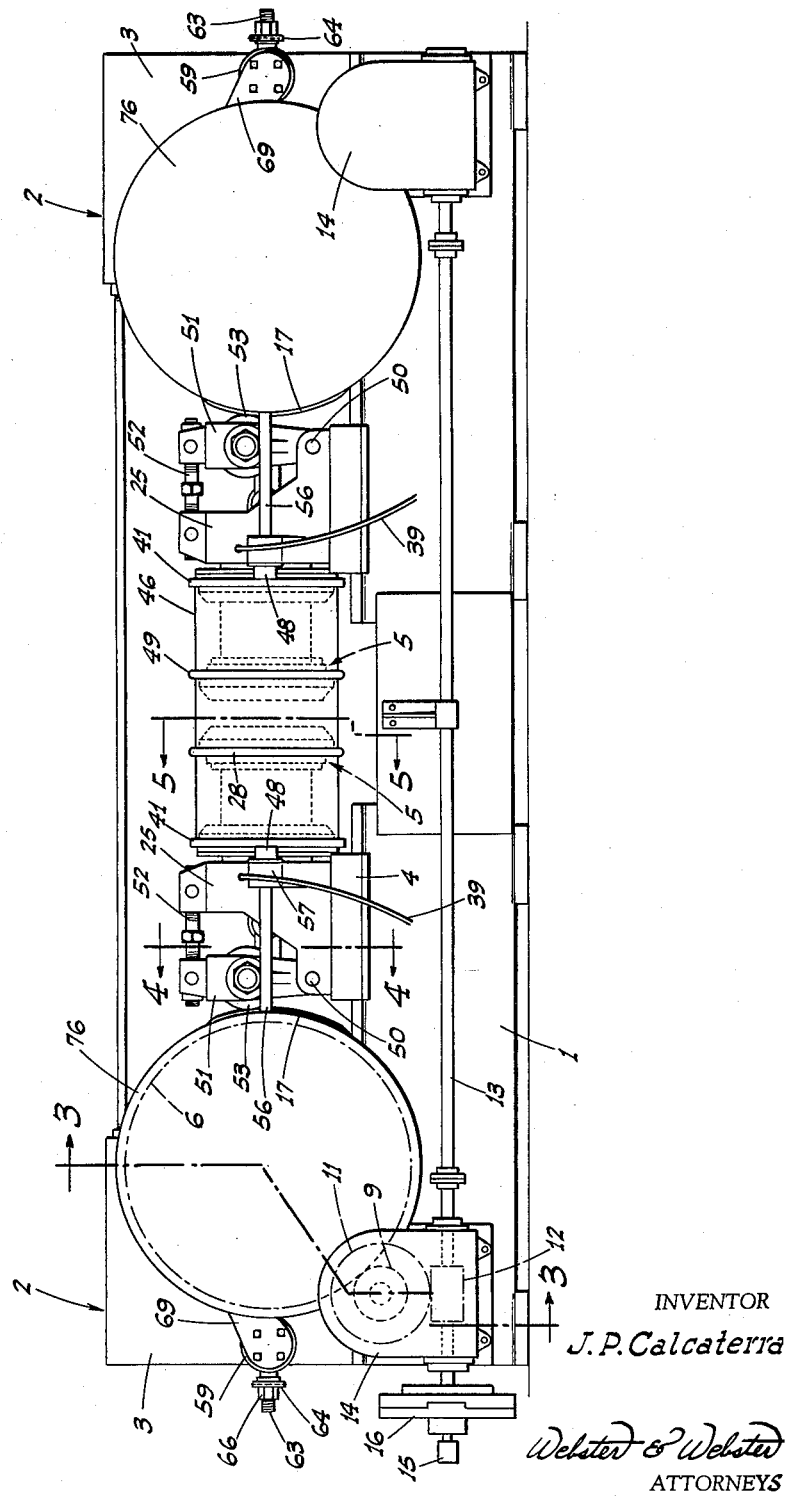
Figure 2:
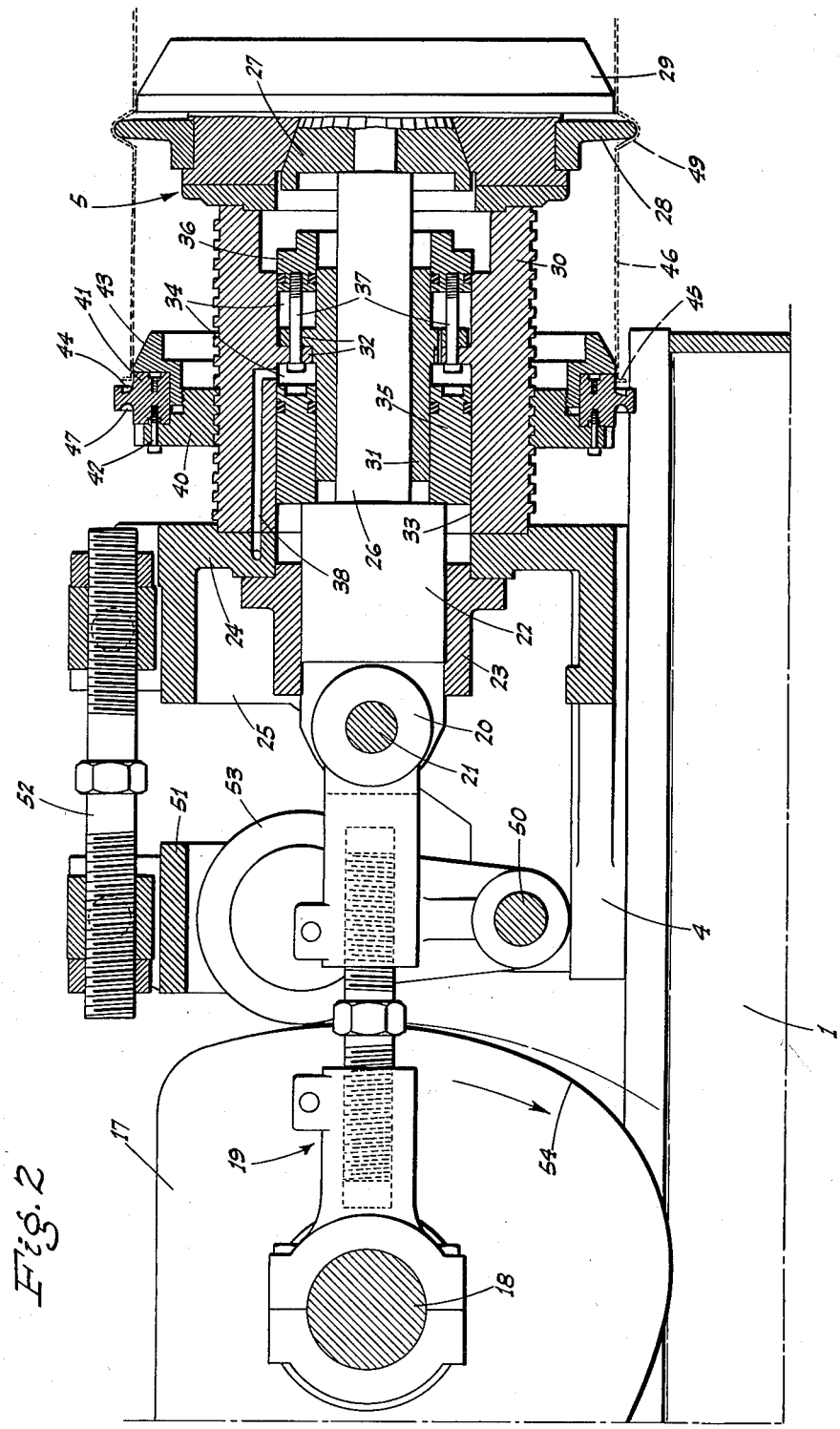
Figure 3:
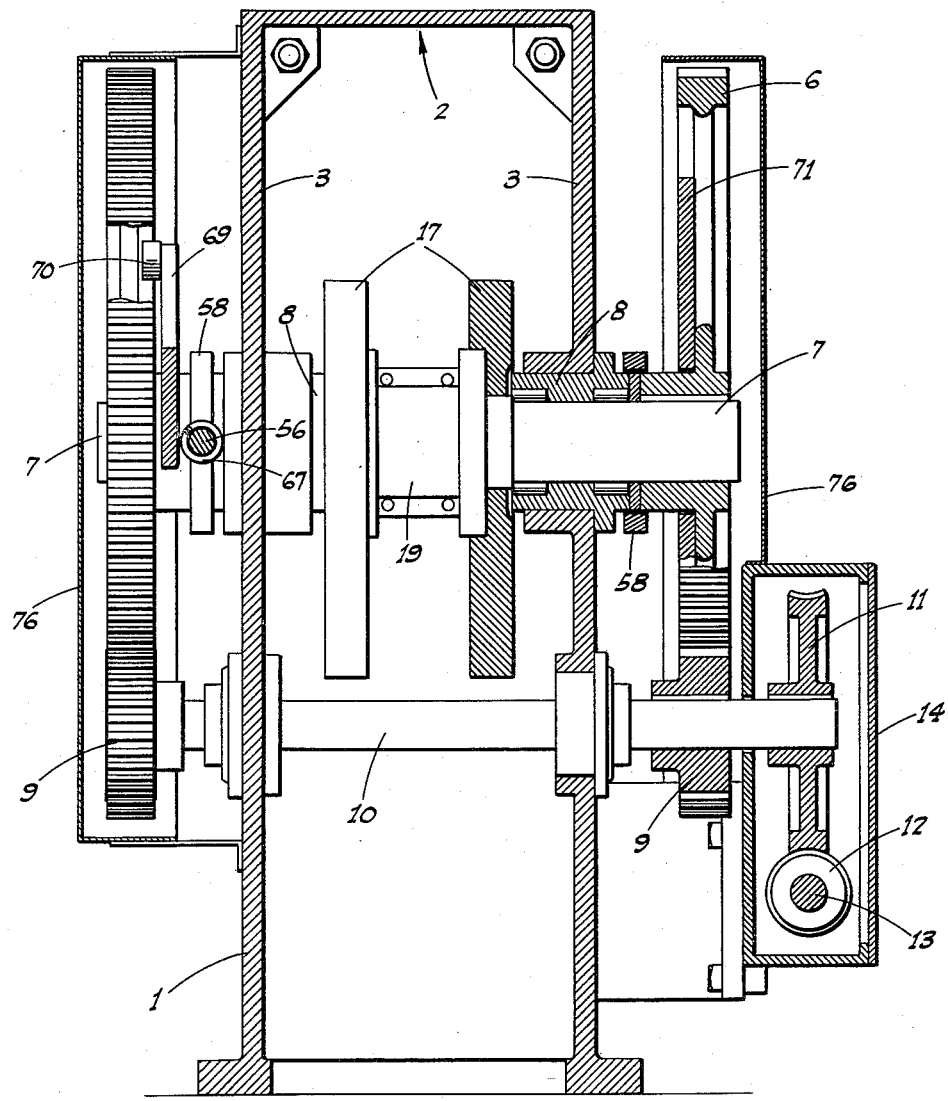
Figure 4:
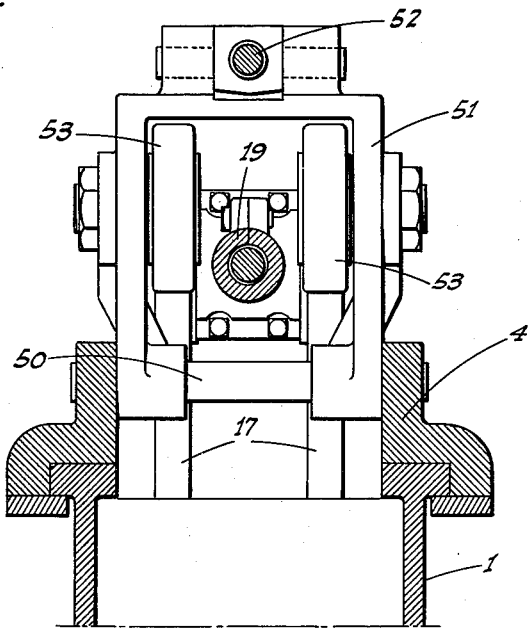
Figure 5:
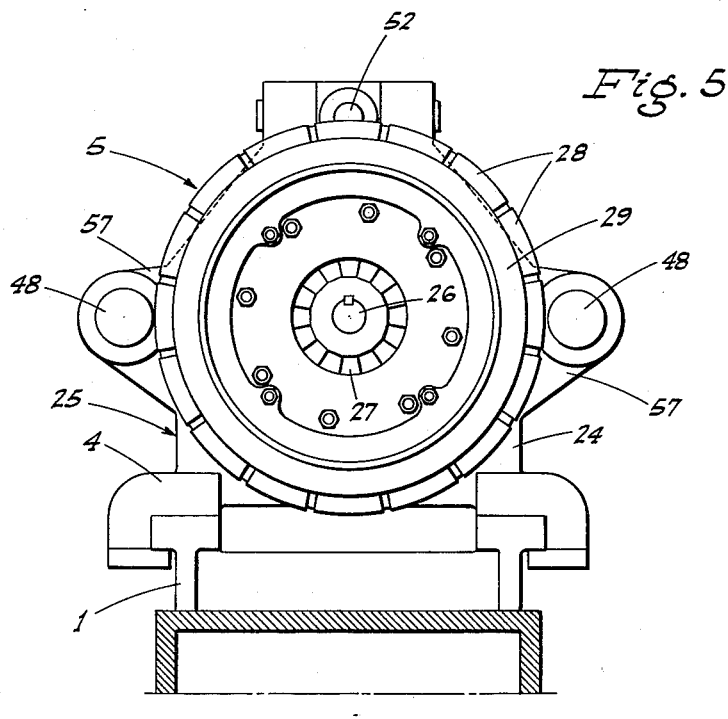

In the drawings:
FIG. 1 is a side elevation of the complete machine, showing a drum body in place, and with the opposed slides advanced and the dies expanded.
FIG. 2 is an enlarged fragmentary longitudinal central section of the machine, with the parts in the same positions as shown in FIG. 1.
FIG. 3 is an enlarged cross section of the machine, substantially on line 3—3 of FIG. 1.
FIG. 4 is a fragmentary enlarged cross section on line 4—4 of FIG. 1.
FIG. 5 is a similar view on line 5—5 of FIG. 1.
FIG. 6 is a fragmentary plan view of one section of the machine, showing particularly the automatically functioning and manually adjustable slide stop unit.

Figure 8:
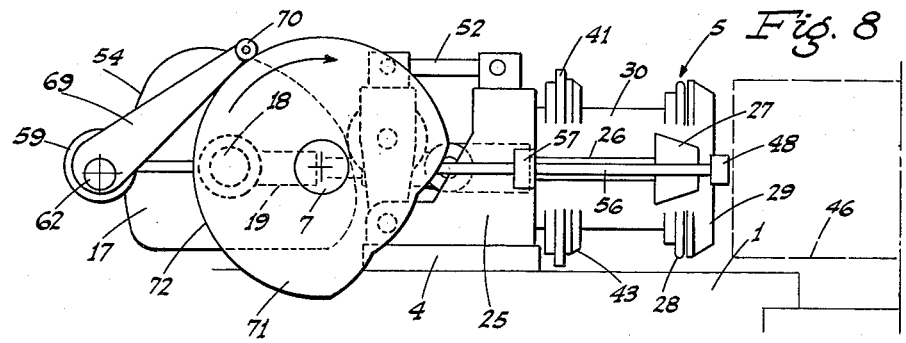
Figure 9:
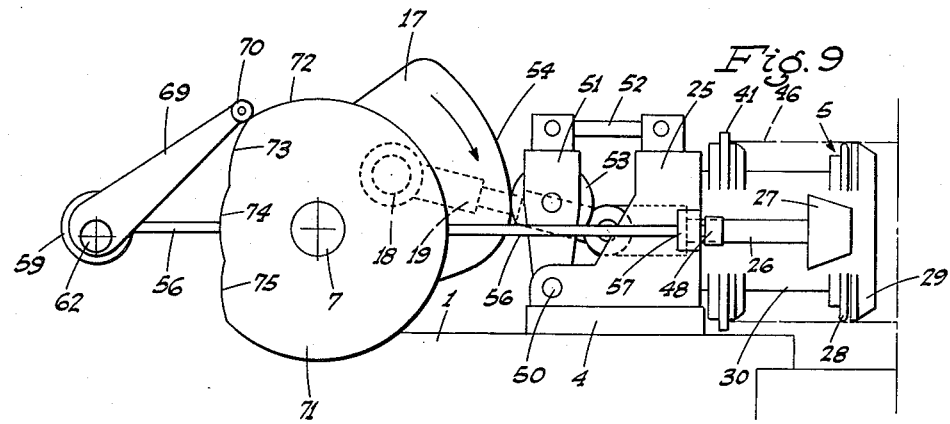
Figure 10:
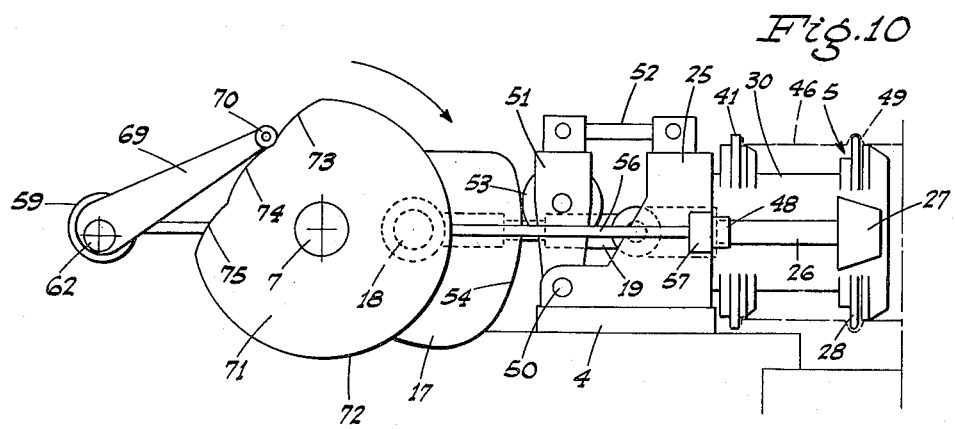

FIG. 7 is a longitudinal section on line 7—7 of FIG. 6.
FIGS. 8–10 inclusive are longitudinal elevational diagrams of one section of the machine showing successive steps in the cycle of operations; FIG. 8 showing the slide fully retracted and the related die head contracted; FIG. 9 showing the slide but not the die expanding cone fully advanced; and FIG. 10 showing said cone advanced and the die head expanded.

Referring now more particularly to the drawings, and to the characters of reference marked thereon, the machine comprises an elongated heavy-duty, floor-supported bed 1, which at its ends includes upstanding rigid supports 2, each support including transversely spaced walls 3.

Between the supports 2 the bed 1 supports longitudinally reciprocable slides 4, each mounting a die head indicated generally at 5. The die heads are disposed in facing relation to each other, and the slides and said heads are arranged for reciprocating movement on the bed in opposite directions, as will be seen later. Since the slides and the related die heads, and the means for actuating or controlling the movements of the same, are identical, a description of one complete unit will suffice for both.

Supported from the walls 3 of the support 2 of one such unit, and disposed laterally out from the walls, are spur gears 6 fixed on separated but alined transverse shafts 7 turnable in bearings 8 mounted in said walls 3, as best shown in FIG. 3. At the bottom, said gears 6 are engaged by pinions 9 fixed on a transverse shaft 10 journaled in said walls 3.

A worm wheel 11 is fixed on one end of shaft 10, which wheel is engaged by a worm 12. This worm is fixed on a shaft 13 which extends lengthwise of the bed 1 and is journaled adjacent one end in a housing 14 secured to the bed 1, and in which the worm wheel and worm are enclosed. The shaft 13 projects the full length of the bed 1 and is there journaled in another similar housing 14 at the other end of the bed; said shaft, within said other housing, being connected to the actuating gears of the other slide and die head unit so that both slides and die heads are actuated simultaneously.

At one end shaft 13 projects from the adjacent housing 14 and is provided with a coupling 15 adapted for connection to the shaft of a drive motor (not shown); a clutch, indicated at 16, being interposed in the shaft 13 between the coupling 15 and said housing 14.

Transversely spaced cranks 17, which are also cams, as will be seen hereinafter, are secured on the laterally inner ends of the shafts 7, between the walls 3 and support a crank pin 18 eccentric to said shafts.

Referring now particularly to FIG. 2, it will be seen that a connecting rod 19, adjustable as to length, engages the crank pin 18 and extends therefrom in a forward direction or away from the related support 2. At its ends opposite the crank pin the rod 19 is formed with a clevis 20 transversely pivoted, as at 21, on a block 22 slidable in a guide sleeve 23 rigid with an upstanding wall 24 which is part of the body 25 of the related slide 4.

Projecting forwardly from the block 22 is a reduced-size plunger rod 26 on the forward end of which a shoe expanding cone 27 is mounted. This cone engages—and when advanced expands—the initially retracted segmental swedging shoes 28 of the die head 5, and which shoes are arranged and mounted in substantially the same manner as shown in said Patent No. 2,720,241. Forwardly of the shoes 28 the die head includes a chamfered drum locating ring 29, the shoes 28 when contracted being radially inward of a such ring.

The die head 5 is mounted on the forward end of a cylindrical tubular barrel 30 which projects forwardly from, and is rigidly secured to, the wall 24 of the slide body 25 so that said barrel is actually a part of the body, and will be so considered hereinafter.

The rod 26 is slidable through a sleeve 31 supported from the barrel 30 by means of cooperating flanges 32 on said barrel and sleeve intermediate the ends thereof. The sleeve 31 is disposed radially inward from the main bore 33 of said barrel 30; said sleeve being shorter than said rod 26 and positioned so as to be clear of the block 22 and cone 27, as shown in FIG. 2.

The barrel 30 thus forms a cylinder 34 on opposite sides of the flanges and about the fixed sleeve 31. A ring-like piston 35 is slidable in the cylinder between the block 22 and the flanges 32, and closely engages the sleeve 31 and the bore 33; said bore extending to the forward end of guide sleeve 23, which end is some distance back from the forward end of the block 22 when advanced, as shown in FIG. 2.

Slidable in the cylinder 34 ahead of the flanges 32 is another piston 36 forming a stop ring for the cone 27 when the latter is retracted; said stop ring normally projecting ahead of the sleeve 31 some distance, as shown. Forward movement of the stop ring is limited by bolts 37 which project rearwardly from the ring and are slidable through the flanges 32, with the heads of the bolts rearwardly of said flanges.

Air under pressure is maintained in cylinder 34 by means of a passage 38 leading from said cylinder through barrel 30 to the exterior of the slide body 25, where said passage is connected to a flexible conduit 39 (see FIG. 1) leading to the source of compressed air, with which most shops are now equipped. With such pressure the piston 35 is forced rearwardly against the block 22, while the stop ring 36 is held at its forward limit of movement.

The exterior surface of the cylindrical barrel 30 is threaded, and mounted thereon for adjustment therealong is a ring 40 on the forward face of which another ring 41 is reversibly mounted by suitable means, such as bolts 42. The ring 41 projects some distance radially out from the locating ring 29 and from a similar ring 43 mounted on ring 40 in front of ring 41.

On one side the projecting portion of the ring 41 is provided with a circumferential groove 44 arranged to form a flange 45 on the adjacent end of a drum 46 supported on the locators 43 and 29. The opposite side of the projecting portion of the ring 41 is provided with a circumferential, substantially semi-circular groove 47 arranged to form a rolled bead rather than a plain flange on said end of the drum.

The supporting ring 40, being adjustable along the barrel 30, the distance from the flanging and beading ring 41 to the swedging shoes 28 may be changed as may be desired and according to the length of the drum.

In the operation of the machine as so far described, the slides 4 at the outset are as far apart as possible to receive a drum 46 therebetween; the crank pin 18 of each connecting rod 19 being in its rearmost position, as shown in FIG. 8. The air pressure in cylinder 34, acting on piston 35, pushes the slide 4 forwardly until the piston engages the forward end of the sleeve 23; the cone 27 being thus retracted relative to shoes 28 so that the latter are also retracted.

This relationship of the parts is maintained as the connecting rod 19 moves forwardly with the rotation of the cranks 17. Each slide offers no resistance to such movement until the slide is adjacent stop 48 mounted in a particular manner, as will be described later. At this time the drum 46 is supported on the locaters 29 and 43, with the drum ends abutting against the opposed rings 41 and holding the slides against further unrestricted advance.

The relative positioning of the parts then obtained is shown in FIG. 9. With the further rotation of cranks 17 to the fully advanced position of the connecting rod 19 the block 22, rod 26, and cone 27 are advanced in the body 25 against the resistance of the compressed air in cylinder 34, and which air forms in effect an advance-resisting spring. The cone 27 then expands the shoes 28 radially outward to form the circumferential rib 49 about the drum, as shown in FIG. 2.

As the connecting rod is thus advanced, the slide is also advanced until it engages the stops 48; the flange 45 (or the bead, as the case may be) being formed with such advance—an operation requiring the exertion of a far greater pressure than can be practicably exerted by the connecting rod 19.

This additional slide-advancing pressure is provided by the following means:

Pivoted at its lower end on the slide 4 rearwardly of the upstanding slide body 25, as at 50, is an upstanding yoke 51, which is adjustably connected at its upper end to the upper end of body 25 by a heavy-duty compression type turnbuckle 52.

The connecting rod 19 passes freely through the yoke 51, and mounted in said yoke are transversely spaced rollers 53. These rollers are aligned with the crank-forming cams 17 to engage the edges thereof; said edges being formed to so engage the rollers and advance the slide a short distance only relative to the advance imparted to said slide by connecting rod movement, and only while the said rod is moving through its cone advancing portion of its stroke, as indicated by the cam-edge portion 54. The remaining portion of each cam edge is relatively unimportant, merely allowing the rollers 53 to be retracted without interference as the cams turn to initially advance and then retract the connecting rod and slide.

The cam edge portions 54 are arranged to engage the rollers 53 so as to gradually advance the slide said short distance. By reason of the above described features of construction, it will be seen that upon lengthening or shortening the turnbuckle 52, the yoke 51 will be swung about the pivot 50 to advance or retract the rollers 53 relative to the slide 4. In this manner, the slide body when advanced by the cam action will be disposed different distances from said cam-edge portions 54.

With the initial retracting movement of the connecting rod, such movement is aided by the pressure exerted by the compressed air against the block 22; the cone 27 being retracted until it contacts the air-pressed cushion ring 36. The cone, thus engaging the ring 36, then pulls the slide 4 back, as the connecting rod returns to its rearmost position, ready to move through another drum swedging operation.

From the use of the original machine of Patent No. 2,720,241 it was found that with the use of fixed stops, such as 48, for the slide, there was a tendency for the swedging shoes 28 to jam or wedge in the ribs 49 as formed in the drum by said shoes. This was because the length of the drum between the ribs naturally lessened somewhat by reason of the outward distortion of the metal of the drum, whereas the straight-line distance between the two sets of shoes remained fixed.

To compensate for this drum shortening action as the ribs are formed, so that the distance between the sets of shoes is correspondingly decreased, the following stop mounting and control arrangement is provided, and which will now be described.

Referring particularly to FIGS. 6 and 7, each stop 48 is mounted on a rearwardly projecting rod unit 56 disposed in the horizontal plane of the axis of shafts 7. The rod unit is slidable through a boss 57 on the corresponding side of the slide body 25 at the wall 24; the lateral spacing between the opposed stops being greater than the diameter of the die head 5 so that the latter may advance and retract without interference from said stops. The rod units 56 are disposed laterally out from the support walls 3, as shown in FIG. 6, and between such walls and the adjacent gears 6, as shown in FIG. 3; each unit including a yoke 58 which straddles the adjacent shaft bearing 8 in clearance relation, as indicated in FIG. 7.

At their rear ends the rod units 56 slidably project through bosses 59 formed on eccentric straps 59a in which eccentrics 60 are turnable. The eccentrics are formed with openings 61 therethrough to receive the adjacent portions of the rods 56 in vertically clearance relation; the arc of rotation of the eccentrics being relatively small, as will be seen.

The eccentrics 60 are fixed on a shaft 62 which extends therebetween and is journaled in walls 3; the shaft being disposed at the bottom of the eccentrics.

The rear end portions of the rod units 56, back of the straps 59a, are threaded, as at 63, and mounted on said threaded portions in abutting relation to the straps are sprockets 64, connected by an endless chain 65. The hub 66 of one of the sprockets may be provided with a square or non-circular surface for engagement with a wrench or the like, so that said sprocket may be easily turned. By this means the distance from the eccentrics 60 to the stops 48 may be simultaneously adjusted to correspond to different adjusted positions of the related slide 4 and cone 27, as may be determined by adjustment of the turnbuckle 52 and the connecting rod 19, respectively. A compression spring 67 is mounted on the rod unit 56 between the forward side of the eccentric strap 59a and a stop collar 68 on said rod unit so as to hold the related sprocket 64 firmly against the rear boss 59 of said strap 59a.

As the connecting rod 19 is moving through the final portion of its stroke and the shoes 28 are being expanded to form the corresponding bead 49, the eccentrics 60 are turned to advance the stops 48 the necessary distance to compensate for the shortening of the drum between the beads, as previously explained.

To this end, an arm 69 is rigid with and projects forwardly from each eccentric; the arm having a roller 70 riding on the edge of a rotary cam 71 fixed with the adjacent gear 6. The major portion 72 of the edge of this cam is concentric with shaft 7; this portion engaging the roller 70 for the full duration of the unrestricted movement of the slide 4, or until the connecting rod 19 starts to advance the shoe expanding cone 27 relative to the slide 4, as indicated in FIG. 9.

From the trailing end of cam portion 72 the adjacent edge portion 73, corresponding in arcuate extent to the arc of movement of the connecting rod during the final portion of its cone-advancing stroke, allows the roller 70 to ride down so as to rotate the eccentric 60 through a sufficient arc to advance the strap 59a and the rod unit and stop 48 the necessary compensating distance. The edge portion 73 is followed by a short dwell portion 74, which in turn is followed by an edge portion 75 which returns the roller 70 to the main edge portion 72. This of course restores the eccentric and its strap, as well as the stop 48, to their initial positions.

It will be noted that advance or retraction of the rod units 56 and stops 48, by means of the sprockets, does not affect—and is not affected by—the advance of the stops by the eccentric action.

It will also be understood that any manual adjustment of the stops 48 must be accompanied by an adjustment of the slide position—by means of the turnbuckle 52 as previously described—and usually the connecting rod 19 as well. The connecting rod may be adjusted alone if it is desired to only alter the height of the beads 49.

Upon the connecting rod 19 moving through its return or slide retracting stroke, the cone 27 first backs away from the die head 5, allowing the shoes 28 to contract. This movement is aided by the air pressure in cylinder 34 then forcing the piston 35 against the block 22; the slide itself being still engaged by the stops 48.

When the cone is fully retracted it engages the air-pressed stop ring 36, which functions as a yieldable cushion. The slide as a whole is then pulled rearwardly and out of the drum by the plunger rod 26 and the connecting rod unit 19 to which said plunger rod is attached. At the same time the stops 48 are being returned to their initial position.

Upon the connecting rod then again moving on its slide advancing stroke, the pressure of the air against piston 35 holds the block in a rearward position in the slide, with the cone retracted, as previously described.

It will be noted that as a safety precaution the otherwise exposed gears 6 and pinions 9 are housed in guards 76.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. In a swedging machine for sheet metal drums, a mounting bed, a longitudinally reciprocating initially retracted slide on the bed, a normally contracted expansible die head mounted on the slide for advance into and retraction from one end of a drum by slide movement, a mechanism to advance the slide along the bed into the drum to a predetermined position and to then cause expansion of the die head to form a circumferential rib in the drum intermediate its ends, a drum-end engaging ring on the slide back from the die head arranged to form a radially outward projection on the drum end upon the final advance of the slide, and means mounting the ring on the slide for longitudinal adjustment thereon; the slide including a cylindrical threaded barrel concentric with the die head and on the outer end of which the latter is mounted, and said ring mounting means comprising another ring threaded on the barrel for movement therealong upon rotation of said other ring; the first named ring being reversibly secured on said other ring and projecting radially outward therefrom.

2. In a swedging machine for sheet metal drums, a mounting bed, a longitudinally reciprocating initially retracted slide on the bed, a normally contracted expansible die head mounted on the slide for advance into and retraction from one end of a drum by slide movement, a ring on the slide back from the die head to abut against said end of the drum before the slide is fully advanced and arranged upon such full advance to deform the drum end radially out, means to advance the slide to a drum-end abutting position and to then expand the die head, and auxiliary slide advancing means acting on the slide subsequent to the initial abutting of the drum end against said ring to advance the slide for a short distance only; said auxiliary slide advancing means comprising, with a driven transverse shaft supported from the bed, a cam on the shaft and a roller mounted on the slide in position to engage the peripheral edge of the cam; said edge being arranged for forceful engagement with the cam only subsequent to the initial engagement of the ring with the drum end and to then exert a slide-advancing pressure against the roller.

3. A structure, as in claim 2, with means to adjust the horizontal position of the roller on the slide and relative to the ring and die head.

4. A structure, as in claim 2, with means to adjust the horizontal position of the roller on the slide and relative to the ring and die head; said means comprising an upstanding yoke on which the roller is mounted, means pivotally mounting the yoke on the slide for fore and aft swinging movement of the yoke and roller, and adjustment means between the yoke and slide to hold the yoke in any swung position.

5. In a swedging machine for sheet metal drums, a mounting bed, longitudinally reciprocating initially retracted opposed slides on the bed to receive a drum therebetween when retracted, normally contracted expansible die heads mounted on the slides in facing relation to each other, mechanism to simultaneously advance the slides to cause the die heads to enter the drum to predetermined positions intermediate the ends thereof and to then expand the die heads to form circumferential outwardly projecting ribs on the drum, stops engaging and initially limiting advancing movement of the slides beyond such predetermined positions of the die heads, and means functioning automatically as the die heads are being expanded to advance the stops away from the corresponding slides sufficient only to compensate for the shortening of the drum between the die heads as the ribs are formed.

6. A structure, as in claim 5, with manual control means formed with the automatically functioning means to advance or retract the stops without affecting the extent of automatic advance thereof.

7. In a swedging machine for sheet metal drums, a mounting bed, longitudinally reciprocating initially retracted opposed slides on the bed to receive a drum therebetween when retracted, normally contracted expansible die heads mounted on the slides in facing relation to each other, mechanism to simultaneously advance the slides to cause the die heads to enter the drum to predetermined positions intermediate the ends thereof and to then expand the die heads to form circumferential outwardly projecting ribs on the drum, each mechanism including a rotary driven shaft disposed transversely of the bed back from the slide and means between said shaft and the related slide to advance the latter through its full travel upon a 180 degree rotation of the shaft, a stop disposed to one side of the slide, a rod unit projecting rearwardly from the stop, a stop-engaging boss on the slide back of the stop and through which the rod unit is slidable, an eccentric strap on the rear end of the rod unit, an eccentric supported from the bed and engaging the strap, a cam on the shaft, and an arm rigid with the eccentric and having an element on its outer end engaging the peripheral edge of the cam; said edge being arranged to cause the eccentric to be turned in a direction to advance the rod unit and stop only as the corresponding die head is being expanded and to an extent sufficient only to compensate for the shortening of the drum between the die heads as the ribs are formed.

8. A machine, as in claim 7, in which the eccentric strap is formed with a boss through which the rod unit is slidable, a member adjustably threaded on the rod unit rearwardly of the boss, and a spring on the rod unit urging the same forwardly.

9. In a swedging machine for sheet metal drums, a mounting bed, a longitudinally reciprocating initially retracted slide on the bed, a normally contracted expansible die head mounted on the slide for advance into and retraction from one end of a drum by slide movement, a mechanism to advance the slide along the bed into the drum to a predetermined position and to then cause expansion of the die head to form a circumferential rib in the drum intermediate its ends and to then retract the slide, said mechanism comprising a longitudinal driven push-pull member, a plunger rod axially movable in the slide and to the rear end of which said member is connected, a die-head expanding cone on the forward end of the rod, an enlarged block on the rear end of the plunger rod, a cylinder in the slide in which said block is slidable, and an air-pressed piston in the cylinder urged against the forward end of the block and yieldably resisting advancing movement of the plunger rod in the slide from a cone-retracted position, there being a stop preventing advance of the slide beyond said predetermined position thereof.

References Cited in the file of this patent
UNITED STATES PATENTS

| | | |
|---|---|---|
| 2,004,816 | Lindgren | June 11, 1935 |
| 2,211,009 | Grotnes | Aug. 13, 1940 |